(12) United States Patent
Zheng et al.

(10) Patent No.: US 10,414,254 B2
(45) Date of Patent: Sep. 17, 2019

(54) FOLDING COVER APPLICABLE TO CARRIAGE

(71) Applicant: Hangzhou Golden Sun Auto Parts Co., Ltd., Hangzhou (CN)

(72) Inventors: Shaoyong Zheng, Hangzhou (CN); Jinqin Fu, Hangzhou (CN); Chenshan Lin, Hangzhou (CN); Peng Cao, Hangzhou (CN); Xiaohong Tang, Hangzhou (CN); Xue'e Wang, Hangzhou (CN)

(73) Assignee: Hangzhou Golden Sun Auto Parts Co., Ltd., Hangzhou (CN)

( * ) Notice: Subject to any disclaimer, the term of this patent is extended or adjusted under 35 U.S.C. 154(b) by 109 days.

(21) Appl. No.: 15/857,639

(22) Filed: Dec. 29, 2017

(65) Prior Publication Data

US 2019/0084388 A1 Mar. 21, 2019

(30) Foreign Application Priority Data

Sep. 21, 2017 (CN) .......................... 2017 1 0862620

(51) Int. Cl.
*B60J 7/04* (2006.01)
*B60J 7/19* (2006.01)
*B60J 10/23* (2016.01)
*B60J 10/90* (2016.01)

(52) U.S. Cl.
CPC .............. *B60J 7/042* (2013.01); *B60J 7/198* (2013.01); *B60J 10/23* (2016.02); *B60J 10/90* (2016.02)

(58) Field of Classification Search
CPC ... H01L 2924/0105; H01L 2924/01082; H01L 2924/0132; H01L 2224/291; H01L 2224/29111; B29C 66/71; B62K 15/008; B65H 2513/51; B21D 39/021; B21D 39/026
USPC ...................................... 296/100.04, 100.02
See application file for complete search history.

(56) References Cited

U.S. PATENT DOCUMENTS 3,482,343 A * 12/1969 Hamu ..................... B41F 15/36
                                                                                101/127.1
4,303,289 A * 12/1981 Hardy ..................... F16B 12/50
                                                                                312/140
4,636,105 A *  1/1987 Johansson ................ A47G 1/10
                                                                                285/424
5,076,736 A * 12/1991 Grewe ................. A47G 1/0611
                                                                                403/295

(Continued)

*Primary Examiner* — Kiran B Patel
(74) *Attorney, Agent, or Firm* — Schwegman Lundberg & Woessner, P.A.

(57) ABSTRACT

The present invention provides a folding cover applicable to a carriage. The folding cover includes a frame, a first shaft, a second shaft, a fixing device and a shielding piece, wherein the frame includes two first frame borders and two second frame borders. The first frame borders and the second frame borders are connected end to end, wherein the second frame borders can be split into three sections. Two ends of the first shaft are detachably inserted into the two second frame borders respectively so that the frame is folded along the first shaft. Two ends of the second shaft are detachably inserted into the two second frame borders respectively so that the frame is folded along the second shaft. The fixing device is disposed at the frame, and the fixing device is used to clamp an edge of the carriage. The shielding piece covers the frame.

10 Claims, 7 Drawing Sheets

(56) References Cited

U.S. PATENT DOCUMENTS

| | | | | |
|---|---|---|---|---|
| 5,788,315 | A * | 8/1998 | Tucker | B60J 7/102 160/395 |
| 6,024,401 | A * | 2/2000 | Wheatley | B60J 7/102 296/100.17 |
| 6,076,881 | A * | 6/2000 | Tucker | B60J 7/141 296/100.07 |
| 6,082,806 | A * | 7/2000 | Bogard | B60J 7/141 296/100.06 |
| 6,257,306 | B1 * | 7/2001 | Weldy | B60J 7/102 160/327 |
| 7,954,876 | B2 * | 6/2011 | Kosinski | B60J 7/102 296/100.17 |
| 8,172,477 | B2 * | 5/2012 | Damsi | B60J 7/062 403/205 |
| 8,960,765 | B2 * | 2/2015 | Facchinello | B60J 7/141 296/100.06 |
| 9,004,571 | B1 * | 4/2015 | Bernardo | B60J 7/141 296/100.03 |
| 9,346,344 | B2 * | 5/2016 | Smith | B60J 7/102 |
| 9,527,373 | B2 * | 12/2016 | Yue | B60J 7/102 |
| 9,586,629 | B2 * | 3/2017 | Leitner | B62D 33/0207 |
| 9,643,479 | B1 * | 5/2017 | Zheng | B60J 10/90 |
| 9,815,358 | B1 * | 11/2017 | Quintus | B62D 33/046 |
| 9,902,329 | B2 * | 2/2018 | Izydorek | B60R 9/042 |
| 9,981,537 | B2 * | 5/2018 | Xu | B60J 7/104 |
| 10,035,408 | B2 * | 7/2018 | Crismon | B60J 7/106 |
| 2003/0193210 | A1 * | 10/2003 | Addicott | B60J 7/08 296/100.04 |
| 2004/0046412 | A1 * | 3/2004 | Moen | B60J 7/102 296/100.02 |
| 2004/0164578 | A1 * | 8/2004 | Mack | B60J 7/1614 296/26.04 |
| 2006/0170239 | A1 * | 8/2006 | Altman | B60J 7/1614 296/100.02 |
| 2012/0274091 | A1 * | 11/2012 | Yue | B60J 7/141 296/100.04 |

\* cited by examiner

FOLDING COVER APPLICABLE TO CARRIAGE

CROSS-REFERENCE TO RELATED APPLICATIONS

This Non-provisional application claims priority under 35 U.S.C. § 119(a) on Patent Application No(s). 201710862620.X filed in People's Republic of China on Sep. 21, 2017, the entire contents of which are hereby incorporated by reference.

BACKGROUND OF THE INVENTION

Field of the Invention

This invention relates to the field of automotive accessory manufacture and, more particularly, to a folding cover applicable to a carriage/box.

Description of the Related Art

In general, models with open carriages/boxes need to be equipped with three-folding covers or folding tops, such that to make it convenient for covering and protecting the goods in the carriage, and to prevent the goods in the carriage from being damaged by sun and rain. Take a pickup truck as an example, the pickup truck is a model with a car head cab, and with an open carriage at the same time. Relying on its beautiful appearance, car-like comfort, strong power, low prices, as well as the practicability of capable of carrying people and carrying goods, pickup truck is welcomed by a plurality of consumers. However, as the carriage of pickup truck is open, the articles in the truck are easily damaged by sun and rain. Although it is possible to avoid above problems by installing a three-folding cover or a till in an open carriage, the installation of the three-folding cover or foldable till on the current market is complicated, and the structure is rough, which is inconvenient to use. And the rough structure of the three-folding cover or till will generate a relatively great resistance during the process of driving, which will affect the user's experience.

Secondly, the sealing property and water resistance property of the existing three-folding cover are not good. In the rainy day, the rain is easy to penetrate into the interior of the carriage, resulting in moisture or even damage of the goods in the carriage. What's more, the rain into the three-folding cover itself and the interior of the carriage will further lead to the corresponding corrosion of metal parts, especially structures like active hinges which act as a role of connection. The corrosion of metal parts will seriously affect the use of the three-folding cover.

What's more, some of the existing three-folding covers or tills take up a relatively large space even in the folded state, which is inconvenient to carry and store.

BRIEF SUMMARY OF THE INVENTION

The objective of the present invention is to provide a folding cover applicable to a carriage/box, which solves the problems of being rough in structure, complex in installation and poor in water resistance of the folding cover in the prior art.

To solve the above problems, the present invention provides a folding cover applicable to a carriage/box. The folding cover includes a frame, a first shaft, a second shaft, a fixing device and a shielding piece, wherein the frame includes two first frame borders and two second frame borders. The two first frame borders are opposite to each other, and the two second frame borders are opposite to each other. The first frame borders and the second frame borders are connected end to end, and each of the two second frame borders includes a first section, a second section and a third section. One end of the first section is detachably inserted into one first frame border, one end of the third section is detachably inserted into the other first frame border, and the second section is located between the first section and the third section. Two ends of the first shaft are detachably inserted into the two second frame borders, respectively, and the other end of the first section is detachably inserted into one end of the second section through the first shaft, such that the frame is folded along the first shaft. Two ends of the second shaft are detachably inserted into the two second frame borders, respectively, and the other end of the second section is detachably inserted into the other end of the third section through the second shaft, such that the frame is folded along the second shaft. The fixing device is disposed at the frame, and the fixing device is used to clamp an edge of the carriage. The shielding piece covers the frame.

According to one embodiment of the present invention, the first shaft may include a first connecting rod and two first connecting assemblies, and the two first connecting assemblies may be located at two ends of the first connecting rod, respectively. Two ends of the first connecting rod may have a first square hole and two first round holes, respectively, and the two first round holes may be located at two sides of the first square hole, respectively. The first connecting assembly may include a first plugging joint and two first rotary joints, and the first plugging joint may have a first square positioning block and two first positioning protrusions. The first square positioning block may be inserted into the first square hole, and the two first positioning protrusions may be located at two sides of the first square positioning block, respectively. The first rotary joint may be provided with a first frame border fixing block, a first rotating cylinder and a first limiting platform, the first limiting platform may be located at one side of the first rotary joint, the first rotating cylinder may extend from the first limiting platform, and the first frame border fixing block may be located at the other side of the first rotary joint. The respective first limiting platform of the two first rotary joints may be rotatably clamped with two first positioning protrusions, respectively, and the respective first rotating cylinder of the two first rotary joints may be inserted into the two first round holes, respectively. Wherein the first frame border fixing block of one of the first rotary joints may be inserted into the first section, and the first frame border fixing block of the other first rotary joint may be inserted into the second section.

According to one embodiment of the present invention, the second shaft may include two second connecting rods and two second connecting assemblies, and two ends of each of the second connecting rods may have a second square hole and a second round hole, respectively. The two second connecting rods may be parallel, and the two second connecting assemblies may be located at two ends of the two second connecting rods, respectively. The second connecting assembly may include a second plugging joint and two second rotary joints, and the second plugging joint may have two second square positioning blocks and two second positioning protrusions. The two second square positioning blocks may be disposed in parallel and spaced apart, the two second square positioning blocks may be inserted into the second square hole of the two second connecting rods, respectively, and the two second positioning protrusions may be located at opposite two sides of the second plugging joint, respectively. The second rotary joint may be provided with a second frame border fixing block, a second rotating cylinder and a second limiting platform. The second limiting platform may be located at one side of the second rotary joint, the second rotating cylinder may extend from the second limiting platform, and the second frame border fixing block may be located at the other side of the second rotary joint. The respective second limiting platform of the two second rotary joints may be rotatably clamped with the two second positioning protrusions, respectively, and the respective second rotating cylinder of the two second rotary joints may be inserted into the second round hole of the two second connecting rods, respectively. Wherein the second frame border fixing block of one of the second rotary joints may be inserted into the second section, and the second frame border fixing block of the other second rotary joint may be inserted into the third section.

According to one embodiment of the present invention, the fixing device may include a sliding clamp block, a rotary rod and a buckle. The sliding clamp block may be slidably connected with the second frame border, the rotary rod may be reversibly connected with the sliding clamp block, and the buckle may be connected with one end of the rotary rod. The buckle may have a clamping part, and one side of the clamping part may have a wavy surface to clamp an edge of the carriage.

According to one embodiment of the present invention, the sliding clamp block may be provided with a T-shaped clamping groove. The rotary rod may be a T-shaped rod, and the rotary rod may clamp at the T-shaped clamping groove to operatively flip along the T-shaped clamping groove.

According to one embodiment of the present invention, the fixing device may further include a triangle nut, and the buckle may be provided with a threaded through hole. One end of the rotary rod may be provided with threads and be inserted into the threaded through hole of the buckle and the triangle nut.

According to one embodiment of the present invention, the folding cover may include a strengthening device. The strengthening device may include a strengthening rod piece, two sliding mechanisms, two roundhead screw stems and two wrenches. Two ends of the strengthening rod piece may be movably connected with the two second frame borders, and the two sliding mechanisms may be slidably disposed at two ends of the strengthening rod piece, respectively. One side of the sliding mechanism may be provided with a fixing groove and a sliding groove. The fixing groove and the sliding groove may be perpendicular and communicated with each other. The respective one end of the two roundhead screw stems may be movably confined to the fixing groove of the two sliding mechanisms, respectively, the two roundhead screw stems may operatively flip from the fixing groove to the sliding groove and move along the sliding groove, respectively, and the two wrenches may be threadably connected with the respective one end of the two roundhead screw stems to lock the position of the two sliding mechanisms, respectively.

According to one embodiment of the present invention, the strengthening rod piece may include a strengthening rod and two rails. Two ends of the strengthening rod may be provided with a 凸-shaped socket, respectively, and one end of the two rails may be movably connected with the two second frame borders, respectively. The other end of the two rails may be provided with a 凸-shaped fixture block, respectively, and the 凸-shaped fixture block of the two rails may be inserted into the 凸-shaped through hole of two ends of the strengthening rod, respectively.

According to one embodiment of the present invention, the sliding mechanism may include a metal slider and a plastic inside slider, and the plastic inside slider may be nested inside the metal slider.

According to one embodiment of the present invention, the folding cover may include a first waterproof piece and a second waterproof piece, and the first waterproof piece may be disposed at the first frame border. The first waterproof piece may have two first waterproof strips which is shark fin shape, and the two first waterproof strips may be distributed at intervals. The second waterproof piece may be disposed at the second frame border and may have two second waterproof strips which are D-shaped. The two second waterproof strips may be disposed side by side.

Compare with the prior art, the present technical solution has following advantages:

The present invention achieves the connection and folding of the first and second sections of the second frame border through the detachable insertion of the first shaft; likewise, the present invention achieves the connection and folding of the second section and the third section by the detachable insertion of the second shaft, such that not only the basic folding function of the folding cover is achieved, but also the first frame border, the second frame border, the first shaft and the second shaft of the whole folding cover are all made to be completely detached and separated out to become independent products. Wherein, the second frame border can be split into three sections, which is convenient for production and maintenance. The whole folding cover is small in size and convenient for transport and storage after detachment and packing. The installation mode of insertion is relatively simple which is convenient for users to use, avoiding the cumbersome installation of using metal hinge joint pieces for the conventional folding cover.

By disposing two first connecting assemblies of the first shaft, the present invention not only realizes the insertion of the first shaft and the portion between the first section and the second section of the second frame border, but also enables the rotary folding between the first section and the second section. Specifically, the first connecting rod is fixed by the first plugging joint of the first connecting assembly, and the connection and the rotary folding function between the first section and the second section are achieved by the first rotary joint connected with both sides of the first plugging joint. In this way, the installation of the first connecting assembly is simple, and users only need to align the corresponding position to achieve insertion thus to complete the installation of the folding cover. This avoids the cumbersome installation of using hinge joint method adopted by the traditional folding cover. In addition, through the insertion mode provided by the present invention, the second frame border and the first shaft of the folding cover are completely detached and separated, and the subcomponents of the first shaft can be replaced and independently produced, which make it convenient for users to maintain.

In the present invention, the width of the second shaft can be greater than the width of the first shaft by disposing two second connecting rods in parallel, such that the frame can further fold along the second shaft after folding along the first shaft, and the second shaft having a wider width than the first shaft can ensure that the folding extent between the second section and third section is large enough. In addition, through the second plugging joint of the second connect assembly, the two parallel second connecting rods are fixed together side by side. Through the two second rotary joints, the connection and rotary folding of the second shaft and the portion between the second section and the third section are achieved, respectively. The installation mode of the second connect assembly is simple which can be completed by simple insertion, and the second frame border and the second shaft can be completely detached and separated, and the subcomponents of the second shaft can be replaced and independently produced, which make it convenient for users to maintain.

The present invention can fix the folding cover to the carriage with different widths and different models by disposing two sliding mechanisms of the strengthening rod assembly. Through adjusting the position of the two sliding mechanisms on the strengthening rod and holding the sliding structure against the sidebar of the carriage, the folding cover can be fixed to the carriage with different widths. In this way, the folding cover provided by the present invention can be applied to the carriage with different models. For different carriages, it does not need to change the structure of the folding cover itself nor to customize the folding cover with different widths, which is practical and convenient.

DETAILED DESCRIPTION OF THE INVENTION

Figure 1:
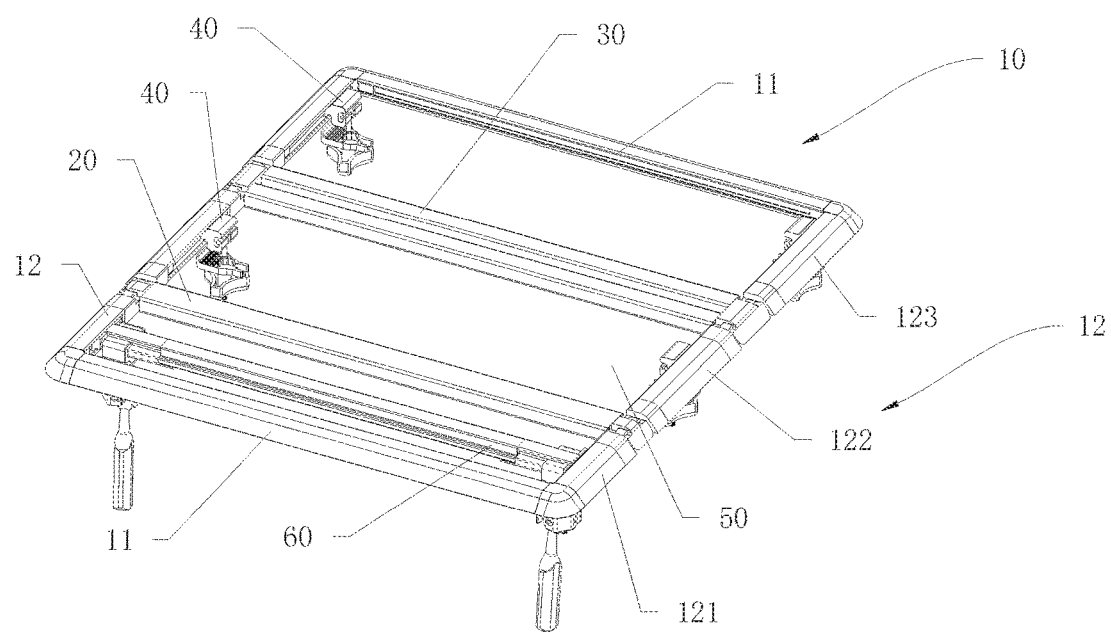
FIG. 1 is a three dimensional structure schematic diagram illustrating a folding cover in an embodiment of the present invention.

The following description is only for the purpose of disclosing the present invention so that those skilled in the present field will be able to practice the present invention. The following embodiments described are only for instance, and those skilled in the present field can think of other obvious variations. The basic principles of the present invention as defined in the following description may be applied to other embodiments, variations, modifications, equivalents, and other alternatives without departing from the spirit and scope of the invention.

Referring to FIG. 1 to FIG. 9, the present invention provides a folding cover applicable to a carriage/box, and the folding cover can be installed in different kinds of vehicles with open carriages/boxes to cover and protect articles placed in the carriages. In particular, the folding cover is applicable for installing at the carriage of pickup truck, but the present invention does not limit the application of the folding cover, and the folding cover can also be applied to other models. A folding cover includes a frame 10, a first shaft 20, a second shaft 30, a fixing device 40 and a shielding piece 50.

Figure 2:
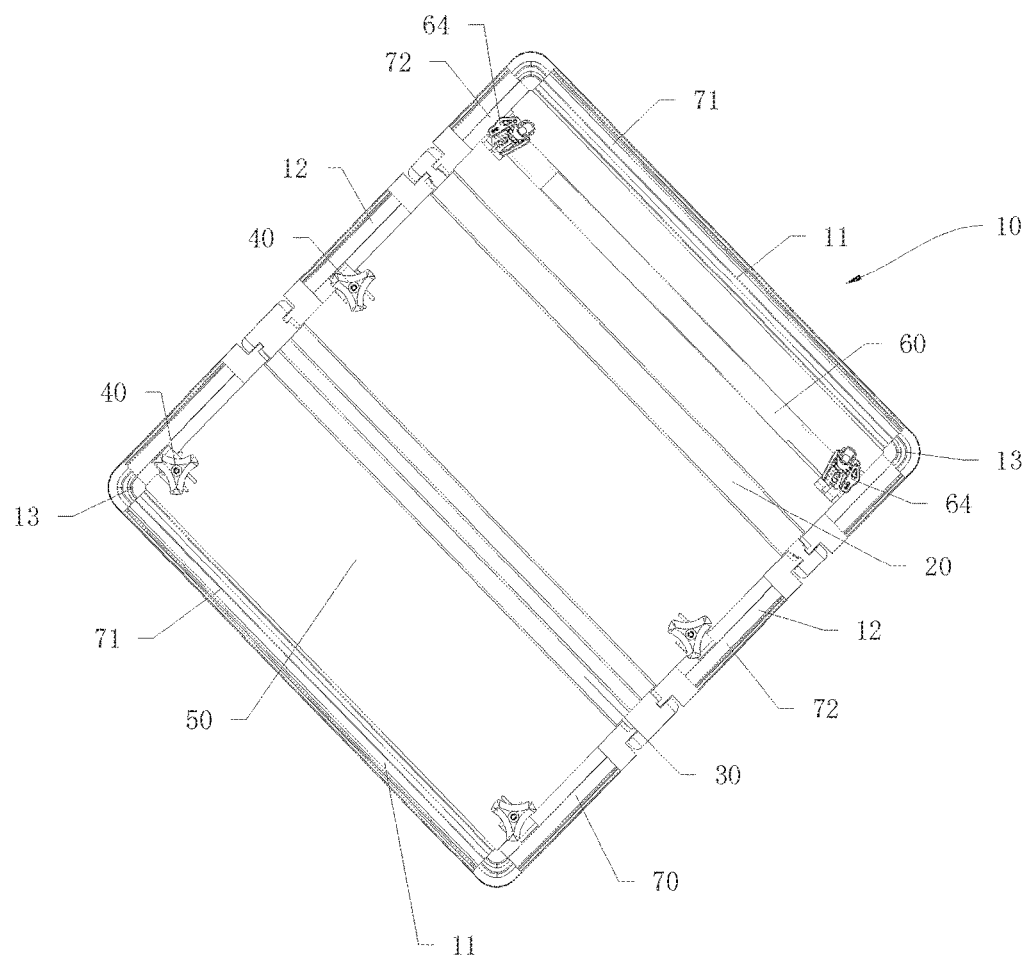
FIG. 2 is a bottom view illustrating the folding cover in the embodiment of the present invention.

As shown in FIG. 1 and FIG. 2, the frame 10 is a rectangular frame that matches the carriage, and the frame 10 includes two first frame borders 11 and two second frame borders 12. Wherein the two first frame borders 11 are opposite to each other, and the two second frame borders are opposite 12 to each other. The first frame borders 11 and the second frame borders 12 are connected end to end, such that the two first frame borders 11 and two second frame borders 12 form a rectangular frame. The size and length-to-width ratio of the frame 10 can be disposed reasonably according to the size of the carriage.

The second frame borders 12 include a first section 121, a second section 122 and a third section 123. One end of the first section 121 is detachably inserted into one first frame border 11, one end of the third section 123 is detachably inserted into the other first frame border 11, and the second section 122 is located between the first section 121 and the third section 123. That is, each second frame border 12 includes three sections, which the first section 121, the second section 122, and the third section 123 are sequentially connected; wherein the first section 121 and the third section 123 are connected with the two first frame borders 11, respectively.

Figure 3:
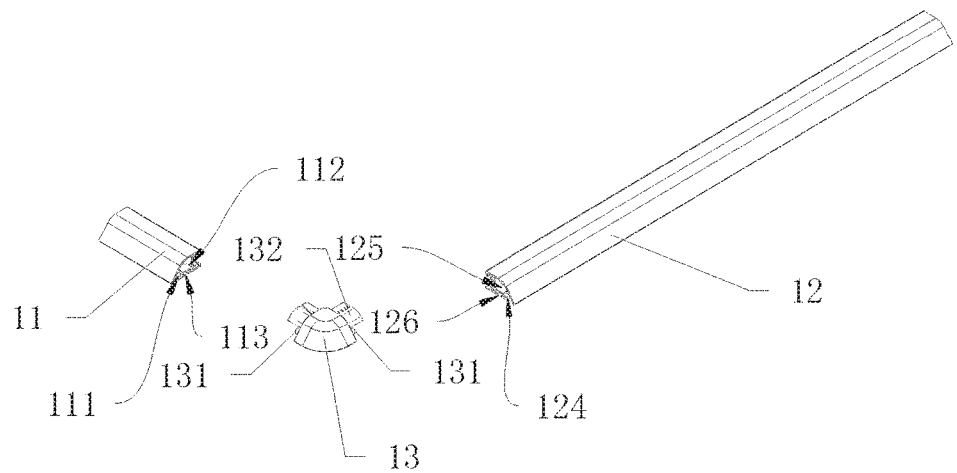
FIG. 3 is a schematic diagram showing a connection mode of a first frame border and a second frame border of the folding cover in the embodiment of the present invention.
Figure 4:
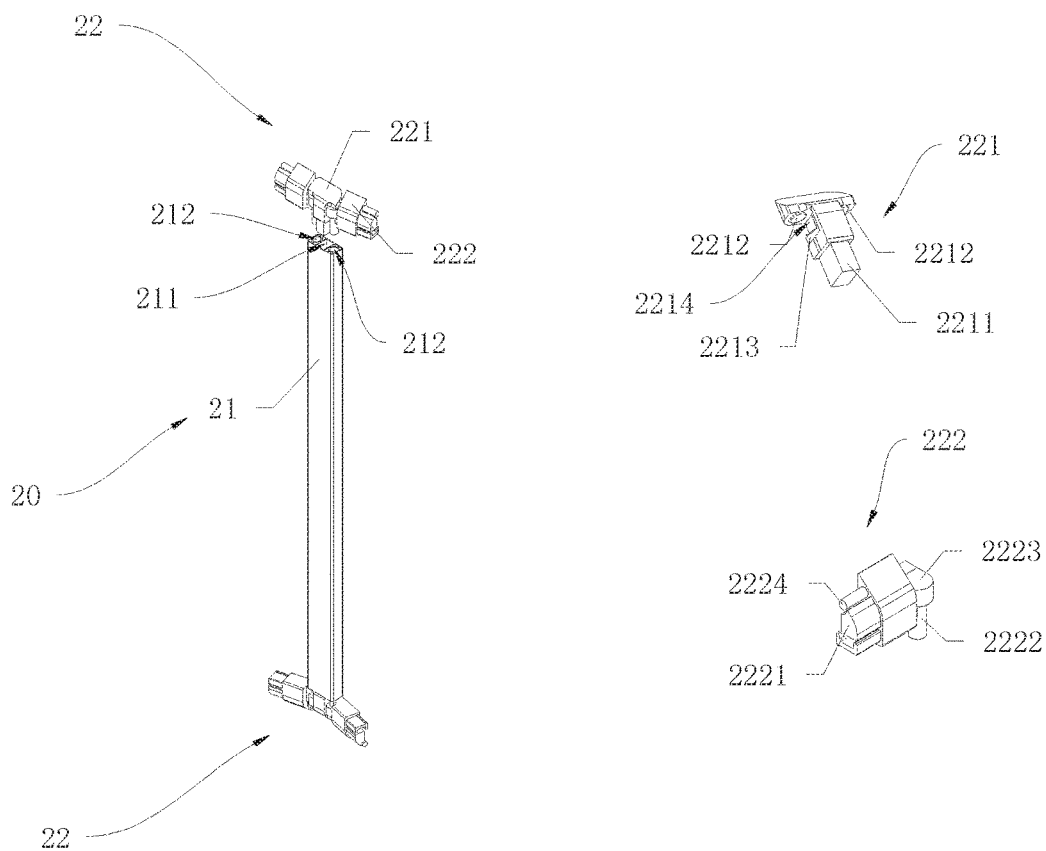
FIG. 4 is a structure schematic diagram illustrating a first shaft of the folding cover in the embodiment of the present invention.
Figure 5:
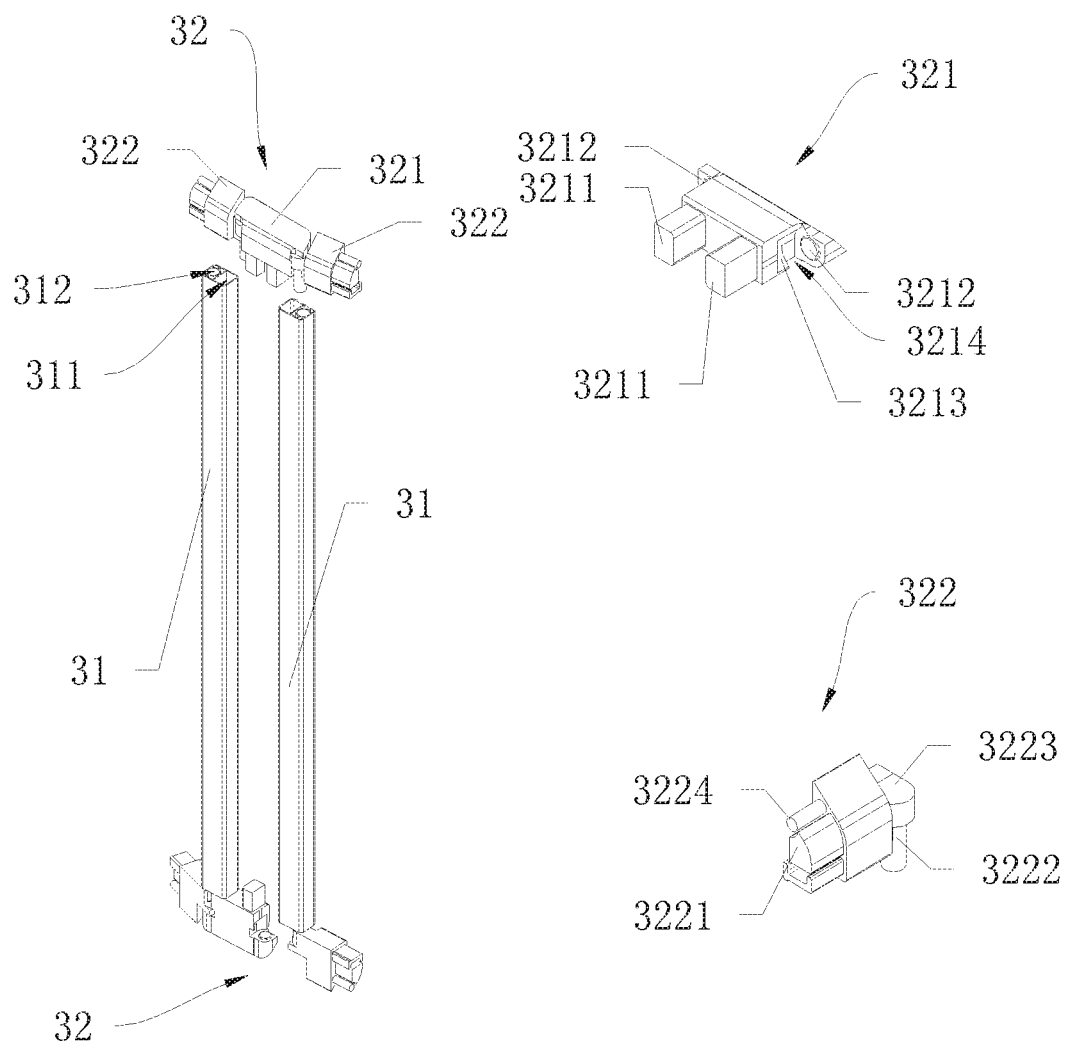
FIG. 5 is a structure schematic diagram illustrating a second shaft of the folding cover in the embodiment of the present invention.
Figure 6:
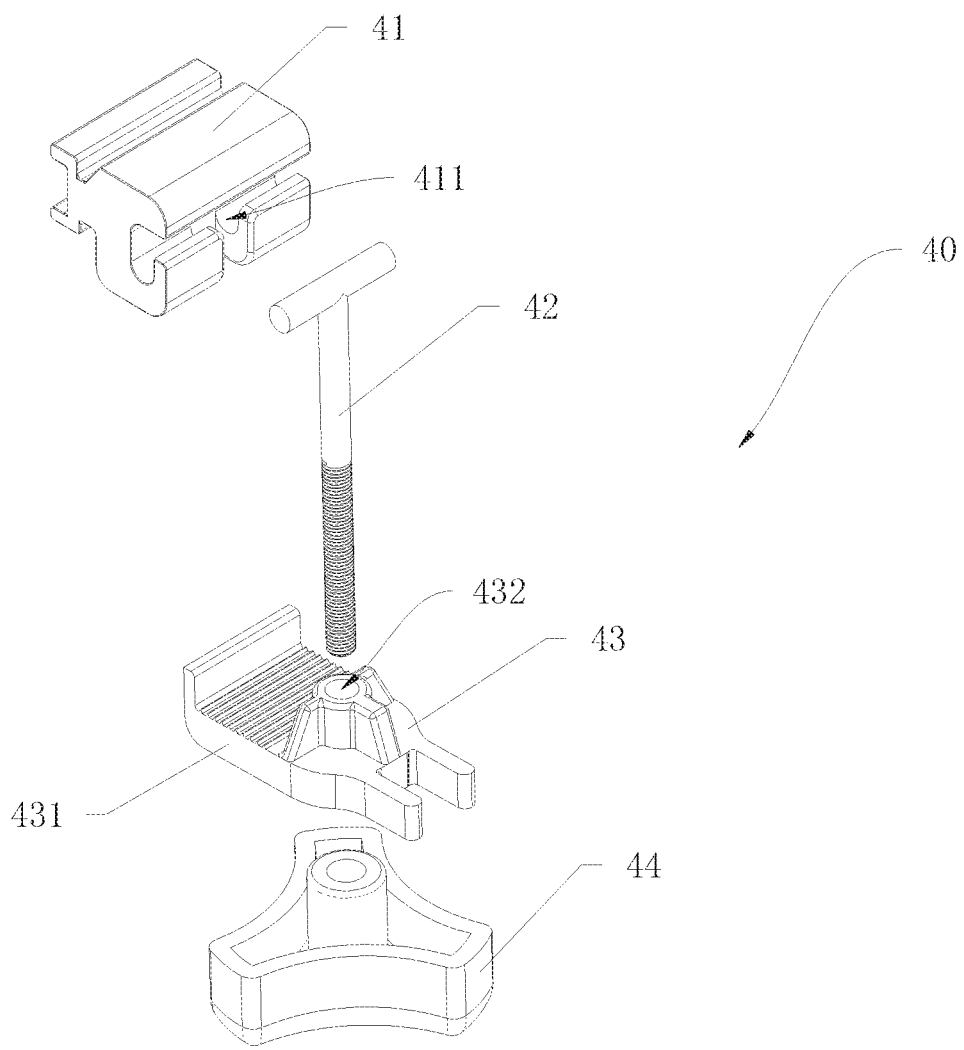
FIG. 6 is a structure schematic diagram illustrating a fixing device of the folding cover in the embodiment of the present invention.

Further, as shown in FIG. 3, the frame 10 further includes corner joints 13, and the number of corner joints 13 is four. The four corner joints 13 are located at four corner positions of the frame 10 to connect the first frame borders 11 and the second frame borders 12. Specifically, the first frame border 11 and the second frame border 12 are inserted into two sides of the corner joint 13, respectively. Two ends of the first frame border 11 are provided with a guiding round groove 111 and a fixed cavity 112, respectively, and two ends of the second frame border 12 are provided with a guiding round groove 124 and a fixed cavity 125. The corner joint 13 is a quarter circle, and both sides of the corner joint 13 have a guiding cylinder 131 and a plug boss 132, respectively. The two guiding cylinders 131 of the corner joint 13 are inserted into the guiding round groove 111 of the first frame border 11 and the guiding round groove 124 of the second frame border 12, respectively. The two plug protrusions 132 of the corner joint 13 are inserted into the fixed cavity 112 of the first frame border 11 and the fixed cavity 125 of the second frame border 12, respectively. In this way, the connection of the first frame border 11 with the second frame border 12 is achieved through the corner joint 13.

Further, the side wall of the first frame border 11 is also provided with a first open through groove 113, and the first open through groove 113 is adjacent to the fixed cavity 112. The side wall of the second frame border 12 is further provided with a second open through groove 126, and the second open through groove 126 is adjacent to the fixed cavity. As shown in the FIG. 3, under the state of use, the first open through groove 113 and the second open through groove 126 are located at the bottom of the first frame border 11 and the bottom of the second frame border 12, respectively.

Both ends of the first shaft 20 are detachably inserted into the two second frame borders 12, respectively, and the other end of the first section 121 of the second frame border 12 is detachably inserted into one end of the second section 122 through the first shaft 20, such that the frame 10 is folded along the first shaft 20. That is, the first section 121 and the second section 122 of each second frame borders 12 are movably connected through one end of the first shaft 20, and two ends of the first shaft 20 are movably connected with the respective first section 121 and the second section 122 of the two second frame borders 12, respectively. The first section 121 and the second section 122 of each second frame borders 12 are operatively flipped and folded together along the first shaft 20, such that the whole frame 10 is operatively folded along the first shaft 20. The first shaft 20 includes a first connecting rod 21 and two first connecting assemblies 22, and the two first connecting assemblies 22 are located at two ends of the first connecting rod 21, respectively. The first connect assembly 22 is not only connected with the end part of two ends of the first connecting rod 21, but also plays a role of connecting the first section 121 with the second section 122 of the second frame border 12 together. In other words, the first section 121 and the second section 122 of the second frame border 12 are connected together through the first connect assembly 22.

Two ends of the first connecting rod 21 have a first square hole 211 and two first round holes 212, respectively, and the two first round holes 212 are located at two sides of the first square hole 211, respectively. The first square hole 211 and two first round holes 212 are disposed side by side. Optionally, the first square hole 211 and the first round holes 212 are all through holes, that is, the first square holes 211 at both ends of the first connecting rod 21 are communicated with each other, and two first round holes 212 at both ends of the first connecting rod 21 are communicated one to one, such that the whole first connecting rod 21 is hollow.

Each first connecting assemblies 22 includes a first plugging joint 221 and two first rotary joints 222, and the first plugging joint 221 has a first square positioning block 2211 and two first positioning protrusions 2212. The first square positioning block 2211 is inserted into the first square hole 211. Two sides of the first square positioning block 2211 are provided with a curved guiding curve surface 2213, respectively, and the guiding curve surface 2213 extends outwardly from both sides of the surface of the first square positioning block 2211. The first positioning protrusion 2212 is round, and the two first positioning protrusions 2212 are located at two sides of the first square positioning block 2211, respectively. A limiting notch 2214 is formed at the area between the guiding curve surface 2213 and the first positioning protrusion 2212.

The first rotary joint 222 is provided with a first frame border fixing block 2221, a first rotating cylinder 2222 and a first limiting platform 2223. The first limiting platform 2223 is located at one side of the first rotary joint 222, the first rotating cylinder 2222 extends from the first limiting platform 2223, and the first frame border fixing block 2221 is located at the other side of the first rotary joint 222.

For one first connect assembly 22, the two first rotary joints 222 are jointed to two sides of the first plugging joint 221, respectively. The respective first rotating cylinder 2222 of the two first rotary joints 222 are inserted into the two first round holes 212, respectively, such that the two first rotary joints 222 freely rotate within the two first rounds holes 212, respectively. The first frame border fixing block 2221 of one of the first rotary joints 222 is inserted into the first section 121 of the second frame border 12, and the first frame border fixing block 2221 of the other first rotary joint 222 is inserted into the second section 122 of the second frame border 12. Thus, one first connect assembly 22 is connected to one end of the first connecting rod 221, and the first section 121 and the second section 122 of one second frame border 12 are connected together through the first connect assembly 22. Similarly, the other first connect assembly 22 is connected with the other end of the first connecting rod 221 by the same way, and the first section 121 and the second section 122 of the other second frame border 12 are connected together. Thus, both ends of the first shaft 20 are movably connected with the two second frame borders 12.

When the folding cover needs to be folded, the respective first section 121 of two second frame borders 12 are flipped upwards simultaneously, or the respective second section 122 of the two second frame borders 12 are flipped upwards simultaneously, such that the first rotary joint 222 connected between the first section 121 and the second section 122 is rotated so that the frame 10 is folded along the first shaft 20. The first section 121 is superposed upon one side of the second section 122.

Both ends of the second shaft 30 are detachably inserted into the two second frame borders 12, respectively, and the second shaft 30 and the first shaft 20 are disposed in parallel and spaced apart. The other end of the second section 122 is detachably inserted into the other end of the third section 123 through the second shaft 30, so that the frame 10 is folded along the second shaft 30. That is, the second section 122 and the third section 123 of each second frame borders 12 are movably connected through one end of the second shaft 30, and two ends of the second shaft 30 are movably connected with the respective second section 122 and the third section 123 of the two second frame borders 12, respectively. The second section 122 and the third section 123 of each second frame borders 12 are operatively flipped and folded together along the second shaft 30 so that the whole frame 10 is operatively folded along the second shaft 30.

The second shaft 30 includes two second connecting rods 31 and two second connecting assemblies 32, and the two second connecting rods are parallel. Two ends of each second connecting rods 31 have a second square hole 311 and second round hole 312, respectively, and the second square hole 311 and the second round hole 312 are disposed side by side. Optionally, the second square hole 311 and the second round hole 312 are all through holes, that is, the second square holes 311 at both ends of the second connecting rod 31 are communicated with each other, and the second round holes 312 at both ends of the second connecting rod 31 are communicated, such that the whole second connecting rod 31 is hollow.

Two second connecting assemblies 32 are located at two ends of two second connecting rods 31, respectively. Each second connect assembly 32 includes a second plugging joint 321 and two second rotary joints 322, and the second plugging joint 321 has two second square positioning blocks 3211 and two second positioning protrusions 3212. Two second square positioning blocks 3211 are disposed in parallel and spaced apart, and two second square positioning blocks 3211 are inserted into the respective second square hole 311 of two second connecting rods 31, respectively, such that the two second connecting rods 31 are fixed together in parallel. Two sides of the second plugging joint 321 are provided with a curved guiding curve surface 3213, respectively. The second positioning protrusion 3212 is round, and the two second positioning protrusions 3212 are located at two sides of the second square positioning block

3211, respectively. The area between the guiding curve surface 3213 and the second positioning protrusion 3212 forms a limiting notch 3214.

The second rotary joint 322 is provided with a second frame border fixing block 3221, a second rotating cylinder 3222 and a second limiting platform 3223. The second limiting platform 3223 is located at one side of the second rotary joint 322, the second rotating cylinder 3222 extends from the second limiting platform 3223, and the second frame border fixing block 3221 is located at the other side of the second rotary joint 322.

For a second connect assembly 32, the two second rotary joints 322 are jointed to two sides of the second plugging joint 321, respectively. The respective second rotating cylinder 3222 of the two second rotary joints 322 are inserted into the second round holes 312 of two second connecting rods 31, respectively, such that the two second rotary joints 322 freely rotate in the two second rounds holes 312, respectively. The second frame border fixing block 3221 of one of the second rotary joints 322 is inserted into the second section 122 of the second frame border 12, and the second frame border fixing block 3221 of the other second rotary joint 322 is inserted into the third section 123 of the second frame border 12. Thus, one end of the same side of the two second connecting rods 321 are connected together through one second connect assembly 32, and the second section 122 and the third section 123 of one second frame border 12 are connected together through the second connect assembly 32. Similarly, the other second connect assembly 32 connects together the other end of the same side of the two second connecting rods 321 by the same way, and the second section 122 and the third section 123 of the other second frame border 12 are connected together. Thus, both ends of the second shaft 30 are movably connected with the two second frame borders 12.

When the folding cover needs to be folded, the respective second section 122 of the two second frame borders 12 are flipped upwards simultaneously, or the respective third section 123 of the two second frame borders 12 are flipped upwards simultaneously, such that the second rotary joint 322 connected between the second section 122 and the third section 123 is rotated so that the frame 10 is folded along the second shaft 30. The second section 122 is superposed upon one side of the third section 123.

The fixing device 40 is disposed at the second frame border 12 of the frame 10 and is used to fix the second frame border 12 and the sidebar of the carriage together, such that the folding cover is fixed at the carriage more securely. In the present embodiment, the folding cover includes four fixing devices 40, and the four fixing devices 40 are respectively disposed at two second frame borders 12 at interval with two as one group. In other embodiment, the number of the fixing device 40 is other values such as two or six, and the present invention does not limit the number of the fixing device 40. The fixing device 40 includes a sliding clamp block 41, a rotary rod 42 and a buckle 43.

The sliding clamp block 41 is slidably connected with the second frame border 12, such that the sliding clamp block 41 operatively slid along the second frame border 12. The sliding clamp block 41 is provided with a T-shaped clamping groove 411.

The rotary rod 42 is reversibly connected with the sliding clamp block 41. The rotary rod 42 is a T-shaped rod, and one end of the rotary rod 42 has threads. The rotary rod 42 is clamped at the T-shaped clamping groove 411 to operatively flipped along the T-shaped clamping groove 411. In other words, in the direction shown in FIG. 6, the rotary rod 42 can rotate from the horizontal plane to the vertical plane along the T-shaped clamping groove 411, or from the vertical plane to the horizontal plane.

The buckle 43 is connected with one end of the rotary rod 41. The buckle 43 is provided with a threaded through hole 432, and one end of the rotary rod 41 is inserted into the threaded through hole 432 of the buckle 43, that is, the buckle 43 and the threaded end of the rotary rod 41 are threaded connected. The buckle 43 has a clamping part 432, and one side of the clamping part 432 has a wavy surface to clamp an edge of the carriage.

In practical operation, users adjust the position of the fixing device 40 at the second frame border 12 and the spacing between two adjacent fixing devices 40 through the sliding clamp block 41. The rotary rod 42 is flipped from the sliding clamp block 41, such that the buckle 43 is just in a horizontal state and the clamping part 432 of the buckle 43 clamps the sidebar of the carriage. Thus, the fixation of the folding cover with the sidebar of the carriage is achieved through the fixing device 40. Wherein the wavy surface of one side of the clamping part 432 plays a role of anti slip, which increases the frictional force between the clamping part 432 and the sidebar of the carriage, making the buckle 43 of the fixing device 40 clamp the edge of the carriage more firmly.

Further, the fixing device 40 further includes a triangle nut 44. The triangle nut 44 is fixed at one end of the rotary rod 42, and the triangle nut 44 is located at one side of the buckle 43. That is, one end of the rotary rod 42 is provided with threads and is inserted into the threaded through hole 432 of the buckle 43 and the triangle nut 44. Both the triangle nut 44 and the buckle 43 are fixed to the same end of the rotary rod 42. The triangle nut 44 plays a role of tightening the buckle 43, such that the buckle 43 can lock the sidebar of the carriage more closely; in addition, users can loosen the triangle nut 44 at first, and then release the lock between the buckle 43 and the sidebar of the carriage to adjust the position of the fixing device 40.

Figure 7:
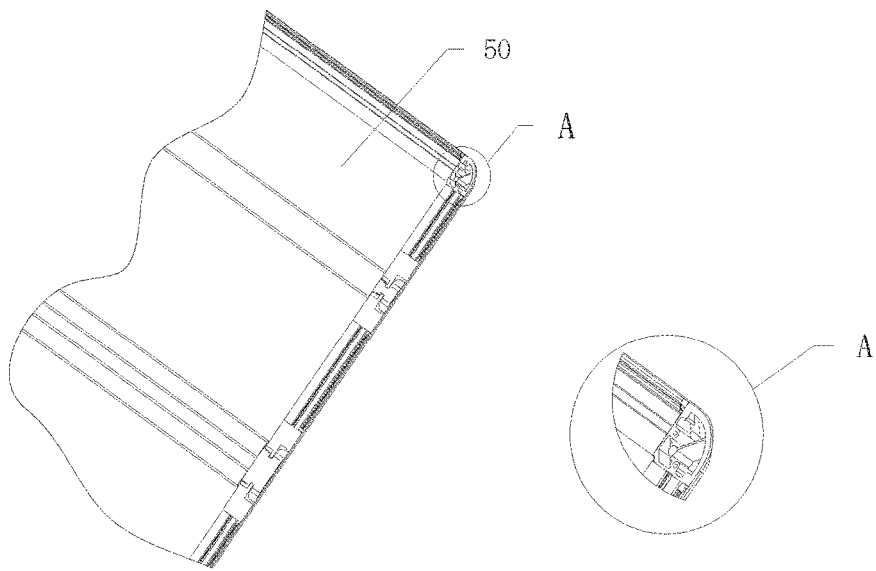
FIG. 7 is a structure schematic diagram illustrating a shielding piece of the folding cover in the embodiment of the present invention.

The shielding piece 50 covers the frame 10 to play a role of covering and protecting articles in the carriage. In the present embodiment, the shielding piece 50 adopts a cortical material so that the shielding piece 50 can not only be dust proof and sun proof, but also has a waterproof function to prevent the articles in the carriage from being caught in the rain. In other embodiments, the shielding piece 50 adopts other material, such as cloth, and the material of the shielding piece 50 of the present invention is not limited. As shown in FIG. 7, the shape and size of the shielding piece 50 are appropriately disposed according to the size of the frame 10, and the edge of the shielding piece 50 is fixed at the first frame border 11 and the second frame border 12 around the frame 10.

The folding cover further includes a strengthening rod assembly 60, and the two ends of the strengthening rod piece 60 are fixed at two second frame borders 12, respectively. The strengthening rod piece 60 is parallel to the first shaft 20 and the second shaft 30, and is located between one of the first frame borders 11 and the first shafts 20. The strengthening rod piece 60 plays a role of strengthening the fixation function of the frame 10. The strengthening rod piece 60 includes a strengthening rod 61, two sliding mechanisms 62, two roundhead screw stems 63 and two wrenches.

Two ends of the strengthening rod 61 are movably connected with the two second frame borders 12 to adjust the position of the strengthening rod 61. Specifically, the strengthening rod 61 includes a rod piece 611 and two rails 612, and two ends of the rod piece 611 are provides with a ⊔-shaped socket 6111, respectively. One end of the two rails 612 are movably connected with two second frame borders 12, respectively, and the other end of the two rails 612 are provided with a ⊔-shaped fixture block 6121, respectively. The respective ⊔-shaped fixture block of the two rails are inserted into the ⊔-shaped socket 6111 located at two ends of the rod piece 612, respectively. In other words, the two rails 612 are inserted into two ends of the rod piece 611, respectively, and the rod piece 611 is movably connected with the two second frame borders 12 through two rails 612. Both sides of the rail 612 are provided with sliding slots 6122, respectively.

The two sliding mechanisms 62 are slidably disposed at two ends of the strengthening rod 61, respectively. In particular, the sliding mechanism 62 is nested at the rail 612 of the strengthening rod 61, and the sliding mechanism 62 can slide along the rail 612. That is, by adjusting the position of the sliding mechanism 62 with respect to the strengthening rod 61, it is possible to adjust the spacing between the two sliding mechanisms 62. One side of the sliding mechanism 62 is provided with a fixing groove 621 and a sliding groove 622. The fixing groove 621 and the sliding groove 622 are vertical and communicated.

Further, the sliding mechanism 62 includes a metal slider 623 and a plastic inside slider 624. The interior of the metal slider 623 has a first cavity 6231, and the top of the metal slider 623 is provided with a first through groove 6232. The first through groove 6232 and the first cavity 6231 are communicated. The top of the metal slider 623 is provided with two fixture blocks 6233, and the two fixture blocks 6233 are located at two sides of the first through groove 6232, respectively. One side of the metal slider 623 is provided with a first groove 6234 and a second groove 6235, and the first groove 6234 and the second groove 6235 are vertical and communicated.

The interior of the plastic inside slider 624 has a second cavity 6241, and the top of the plastic inside slider 624 is provided with a second through groove 6242. The second through groove 6242 and the second cavity 6241 are communicated. The railway 612 is inserted into the second cavity 6241 of the plastic inside slider 624, and the plastic inside slider 624 is sleeved on the rail 612 to slide along the rail 612. The plastic inside slider 624 is embedded inside the metal slider 623. That is, the plastic inside slider 624 is located in the first cavity 6231 of the metal slider 623, and the metal slider 623 wraps the plastic inside slider 624, such that the metal slider 623 and the plastic inside slider 624 are integrally sleeved on the rail 612 to slide along the rail 612. That is to say, the rail 612 is inserted into the second cavity 6241 of the plastic inside slider 624, and the fixture block 6233 of the metal slider 623 is clamped in the sliding slot 6122. In practical applications, the metal slider 623 and the plastic inside slider 624 are bonded together by glue. One side of the plastic inside slider 624 is provided with a third groove 6243 and a fourth groove 6244, and the third groove 6243 and the fourth groove 6244 are vertical and communicated. The position of the third groove 6243 of the plastic inside slider 624 corresponds to the position of the first groove 6234 of the metal slider 623, and the size and shape of the third groove 6243 match with the first groove 6234, such that the first groove 6234 and the third groove 6243 two form the fixing groove 621. Similarly, the position of the fourth groove 6244 of the plastic inside slider 624 corresponds to the position of the second groove 6235 of the metal slider 623, and the size and shape of the fourth groove 6244 match with the second groove 6235 such that the second groove 6235 and the fourth groove 6244 two form the sliding groove 622.

Figure 8:
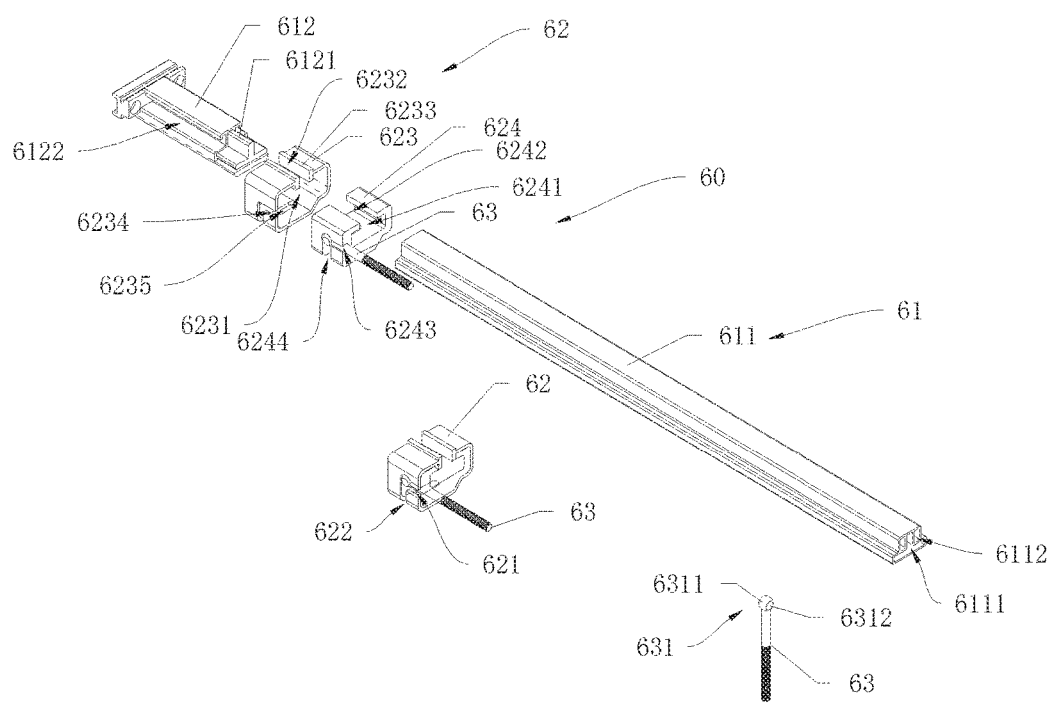
FIG. 8 is a structure schematic diagram illustrating a strengthening rod of the folding cover in the embodiment of the present invention.
Figure 9:
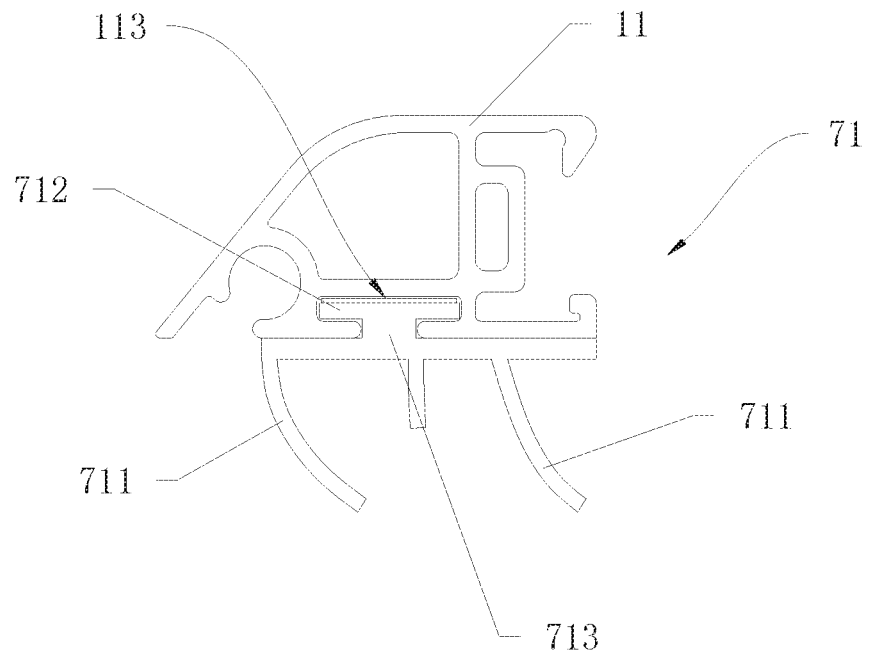
FIG. 9 is a structure schematic diagram illustrating a first waterproof piece of the folding cover in the embodiment of the present invention.
Figure 10:
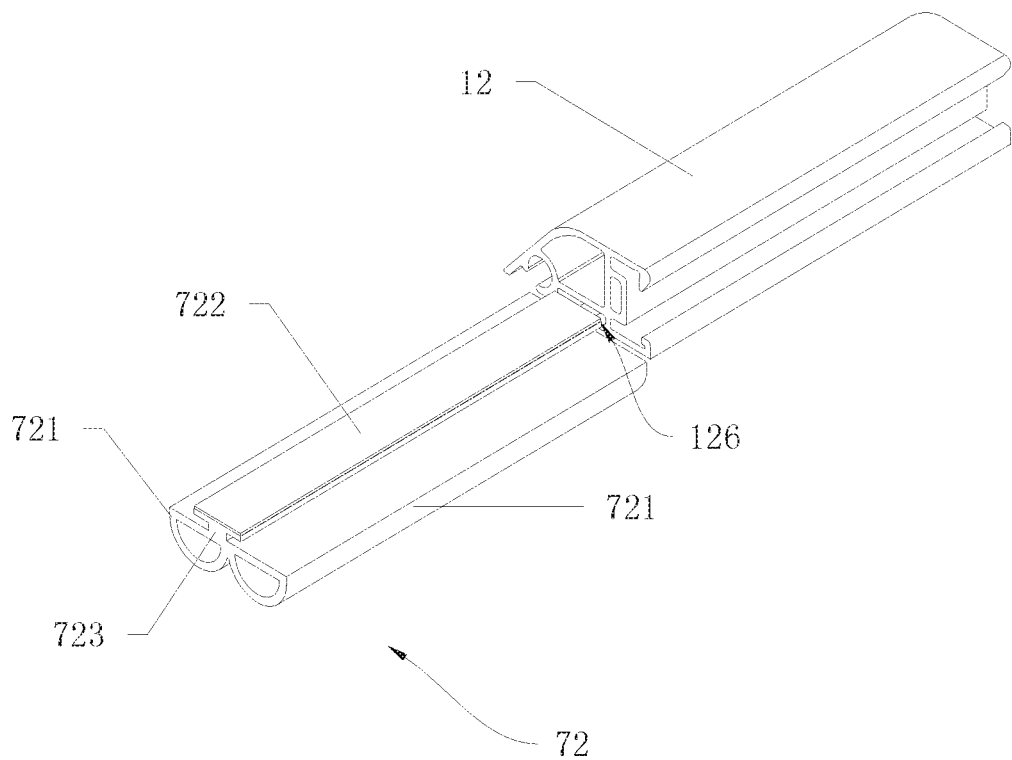
FIG. 10 is a structure schematic diagram illustrating a second waterproof piece of the folding cover in the embodiment of the present invention.

Two roundhead screw stems 63 are connected with two sliding mechanisms 62, respectively. One end of the roundhead screw stem 63 is provided with threads, and the other end of the roundhead screw stem 63 is provided with a roundhead body 631. The roundhead body 631 has a roundhead round face 6311 and a roundhead square face 6312. The respective one end of the two roundhead screw stems 63 are movably confined to the fixing groove 621 of the two sliding mechanisms 62, respectively, and the two roundhead screw stems 63 are operatively flipped from the fixing groove 621 to the sliding groove 622 and move along the sliding groove 622, respectively. Specifically, as shown in FIG. 8, one end of the roundhead screw stem 63 provided with the roundhead body 631 is confined to the fixing groove 621, and the roundhead screw stem 63 is horizontally fixed to the fixing groove 621; and users can first rotate the roundhead screw stem 631 horizontally from the fixing groove 621 and then flip the roundhead screw stem 631 vertically so that the roundhead screw stem 631 is flipped from the fixing groove 621 to the sliding groove 622, and the roundhead screw stem 631 is operatively slide along the sliding groove 622. Conversely, users can also flip the roundhead screw stem 63 from the sliding groove 622 to the fixing groove 621 according to the opposite operation.

As shown in FIG. 2, two wrenches 64 are respectively threaded connected with the respective one end of the two roundhead screw stems 63 to lock the position of the two sliding mechanisms 62, respectively. Specifically, the wrench 64 is connected with one end of the roundhead screw stem 63 provided with threads, and the wrench 64 can move along the threads of the roundhead screw stem 63 to adjust the position of the wrench 64 on the roundhead screw stem 63. By adjusting the position of the wrench 64 on the roundhead screw stem 63 and tightening the wrench 64, the wrench 64 is against the strengthening rod 61 and cannot move, such that the sliding mechanism 62 is locked to the strengthening rod 61, while the position of the sliding mechanism 62 cannot be moved at this time. Conversely, when the position of the sliding mechanism 62 need to be changed, users may first reversely loosen the wrench 64 to unlock the sliding mechanism 62, and then slide the sliding mechanism 62 to the appropriate position. It should be noted that, under the state of use, the wrench 64 is located below the frame 10 of the folding cover, thus the wrench 64 is not seen at the angle shown in FIG. 1, while the wrench 64 can be seen in the top view shown in FIG. 2.

Further, the folding cover includes a first waterproof piece 71 and a second waterproof piece 72. Wherein the first waterproof piece 71 is a shark fin adhesive strip and is disposed at the first frame border 11. The first waterproof piece 71 has two first waterproof strips 711, and the first waterproof strip 711 is a sharp fin shape. The two first waterproof strips 711 are distributed at intervals. The second waterproof piece 72 is a double D-shaped adhesive strip and is disposed at the second frame border. The second waterproof piece 72 has two second waterproof strips 721 which are D-shaped. The two second waterproof strips are disposed side by side.

The first waterproof piece 71 further includes a first aluminum substrate 712 and a first rubber substrate 713, wherein the first rubber substrate 713 is vertically jointed to the first aluminum substrate 712, and the two first waterproof strips 711 are jointed to two sides of the first rubber substrate 713, respectively. The first rubber substrate 713 and the first aluminum substrate 712 are inserted into the first open through groove 113 of the first frame 11. Optionally, the first rubber substrate 713 is an ethylene-propylene-diene-terpolymer rubber (EPDM) substrate.

The second waterproof piece 72 further includes a second aluminum substrate 722 and a second rubber substrate 723, wherein the second rubber substrate 723 is vertically jointed to the second aluminum substrate 722, and two second waterproof strips 721 are jointed to two sides of the second rubber substrate 723, respectively. The second rubber substrate 723 and the second aluminum substrate 722 are inserted into the second open through groove 126 of the second frame 12. Optionally, the second rubber substrate 723 is an EPDM substrate.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A folding cover applicable to a carriage, comprising:
   a frame, comprising two first frame borders and two second frame borders, wherein the two first frame borders are opposite to each other, the two second frame borders are opposite to each other, and the first frame borders are connected with the second frame borders end to end, wherein the second frame border comprises a first section, a second section, and a third section, one end of the first section is detachably inserted into one of the first frame borders, one end of the third section is detachably inserted into the other first frame border, and the second section is located between the first section and the third section;
   a first shaft, two ends being detachably inserted into the two second frame borders, respectively, wherein the other end of the first section is detachably inserted into one end of the second section through the first shaft, such that the frame is folded along the first shaft;
   a second shaft, two ends being detachably inserted into the two second frame borders, respectively, wherein the other end of the second section is detachably inserted into the other end of the third section through the second shaft, such that the frame is folded along the second shaft;
   a fixing device, disposed at the frame, wherein the fixing device is used to clamp an edge of the carriage; and
   a shielding piece, covering the frame.

2. The folding cover of claim 1, wherein the first shaft comprises a first connecting rod and two first connecting assemblies, the two first connecting assemblies are located at two ends of the first connecting rod, respectively, two ends of the first connecting rod have a first square hole and two first round holes, respectively, and the two first round holes are located at two sides of the first square hole, respectively, wherein each of the first connecting assemblies comprises a first plugging joint and two first rotary joints, the first plugging joint has a first square positioning block and two first positioning protrusions, the first square positioning block is inserted into the first square hole, and the two first positioning protrusions are located at two sides of the first square positioning block, respectively, wherein each of the first rotary joints is provided with a first frame border fixing block, a first rotating cylinder, and a first limiting platform, the first limiting platform is located at one side of each of the first rotary joints, the first rotating cylinder extends from the first limiting platform, the first frame border fixing block is located at the other side of each of the first rotary joints, the first limiting platform of each of the two first rotary joints is rotatably clamped at the two first positioning protrusions, respectively, and the first rotating cylinder of each of the two first rotary joints is inserted into the two first round holes, respectively, wherein the first frame border fixing block of one of the first rotary joints is inserted into the first section, and the first frame border fixing block of the other first rotary joint is inserted into the second section.

3. The folding cover of claim 1, wherein the second shaft comprises two second connecting rods and two second connecting assemblies, two ends of each of the second connecting rods have a second square hole and a second round hole, the two second connecting rods are parallel, and the two second connecting assemblies are located at two ends of the two second connecting rods, respectively, wherein each of the two second connecting assemblies comprises a second plugging joint and two second rotary joints, the second plugging joint has two second square positioning blocks and two second positioning protrusions, the two second square positioning blocks are disposed in parallel and spaced apart, the two second square positioning blocks are inserted into the second square hole of the two second connecting rods, respectively, and the two second positioning protrusions are located at opposite two sides of the second plugging joint, respectively, wherein each of the two second rotary joints is provides with a second frame border fixing block, a second rotating cylinder and a second limiting platform, the second limiting platform is located at one side of the second rotary joint, the second rotating cylinder extends from the second limiting platform, the second frame border fixing block is located at the other side of the second rotary joint, the respective second limiting platform of the two second rotary joints is rotatably clamped with the two second positioning protrusions, respectively, the respective second rotating cylinder of the two second rotary joints are inserted into the second round hole of the two second connecting rods, respectively, the second frame border fixing block of one of the second rotary joints is inserted into the second section, and the second frame border fixing block of the other second rotary joint is inserted into the third section.

4. The folding cover of claim 1, wherein the fixing device comprises a sliding clamp block, a rotary rod and a buckle, the sliding clamp block is slidably connected with the second frame border, the rotary rod is reversibly connected with the sliding clamp block, and the buckle is connected with one end of the rotary rod, wherein the buckle has a clamping part, and one side of the clamping part has a wavy surface to clamp the edge of the carriage.

5. The folding cover of claim 4, wherein the sliding clamp block is provided with a T-shaped clamping groove, the rotary rod is a T-shaped rod, and the rotary rod clamps at the T-shaped clamping groove to operatively flip along the T-shaped clamping groove.

6. The folding cover of claim 4, wherein the fixing device further comprises a triangle nut, the buckle is provided with a threaded through hole, and one end of the rotary rod is provided with threads and is inserted into the threaded through hole of the buckle and the triangle nut.

7. The folding cover of claim 1, wherein the folding cover comprises a strengthening assembly, the strengthening assembly comprises a strengthening rod, two sliding mechanisms, two roundhead screw stems and two wrenches, two ends of the strengthening rod are movably connected with the two second frame borders, and the two sliding mechanisms are slidably disposed at two ends of the strengthening rod, respectively, wherein one side of the sliding mechanism is provided with a fixing groove and a sliding groove, the fixing groove and the sliding groove are perpendicular and communicated with each other, the respective one end of the two roundhead screw stems is movably confined to the fixing groove of the two sliding mechanisms, respectively, the two roundhead screw stems operatively flip from the fixing groove to the sliding groove and move along the sliding groove, respectively, and the two wrenches are threadably connected with the respective one end of the two roundhead screw stems to lock the position of the two sliding mechanisms, respectively.

8. The folding cover of claim 7, wherein the strengthening rod comprises a rod piece and two rails, two ends of the rod piece are provides with a 凸-shaped socket, and one end of the two rails immovably connected with the two second frame borders, respectively, wherein the other end of the two rails are provided with a 凸-shaped fixture block, respectively, and the 凸-shaped fixture block of the two rails are inserted into the 凸-shaped through hole of two ends of the rod piece, respectively.

9. The folding cover of claim 8, wherein the sliding mechanism comprises a metal slider and a plastic inside slider, and the plastic inside slider is nested inside the metal slider.

10. The folding cover of claim 1, wherein the folding cover comprises a first waterproof piece and a second waterproof piece, and the first waterproof piece is disposed at the first frame border, wherein the first waterproof piece has two first waterproof strips, the first waterproof strip is shark fin shape, and the two first waterproof strips are distributed at intervals, wherein the second waterproof piece is disposed at the second frame border, the second waterproof piece has two second waterproof strips, the second waterproof strip is D-shaped, and the two second waterproof strips are disposed side by side.

* * * * *